(12) United States Patent
Horn et al.

(10) Patent No.: US 6,985,102 B1
(45) Date of Patent: Jan. 10, 2006

(54) METHOD AND SYSTEM FOR DEINTERLEAVING

(75) Inventors: William T. Horn, Littleton, CO (US); Steven F. Hurt, Parker, CO (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 10/883,130

(22) Filed: Jul. 1, 2004

(51) Int. Cl.
*G01S 7/40* (2006.01)

(52) U.S. Cl. .............................. 342/13; 342/40; 342/90; 342/195

(58) Field of Classification Search ................. 342/13, 342/40, 90, 97–99, 108, 109, 111, 113, 115, 342/133, 137, 139, 145–147, 159, 162, 189, 342/192, 194, 195
See application file for complete search history.

(56) References Cited

U.S. PATENT DOCUMENTS

| | | | | |
|---|---|---|---|---|
| 4,040,054 A | * | 8/1977 | Overman ..................... | 342/13 |
| 4,217,580 A | * | 8/1980 | Lowenschuss ............... | 342/13 |
| 4,721,958 A | | 1/1988 | Jenkin ......................... | 342/13 |
| 4,879,561 A | * | 11/1989 | Inkol .......................... | 342/195 |
| 4,918,455 A | | 4/1990 | Maier .......................... | 342/13 |
| 5,063,385 A | * | 11/1991 | Caschera ..................... | 342/13 |
| 5,091,917 A | * | 2/1992 | Udd et al. ................... | 375/224 |
| 5,323,161 A | * | 6/1994 | Gailer et al. ................. | 342/13 |
| 5,381,150 A | * | 1/1995 | Hawkins et al. ............. | 342/13 |
| 5,396,250 A | | 3/1995 | Tsui et al. .................... | 342/13 |
| 5,563,806 A | | 10/1996 | Barry et al. ................. | 364/516 |
| 5,583,505 A | * | 12/1996 | Andersen et al. | |
| 6,147,646 A | | 11/2000 | Arneson et al. ............ | 342/417 |
| 6,788,243 B2 | * | 9/2004 | Lavoie ........................ | 342/13 |
| 6,876,321 B1 | * | 4/2005 | Slutzky et al. ................ | 342/13 |
| 2005/0033789 A1 | * | 2/2005 | Sirois ......................... | 708/422 |

OTHER PUBLICATIONS

"Using model checking for verification of partitioning properties in integrated modular avionics", D.: Engstrom, E; Weininger, N.; Penix, J.; Visser, W. Digital Avionics Systems Conferences, 2000. Proceedings. DASC. The 19th vol. 1, Ps: 1D2/1-1D210.*

"Enhanced Memory FIFO Buffer", G. Isaac et al, IBM Technical Disclosure Bulletin, vol. 35, No. 7, Dec. 1992, ps 385-386.*

* cited by examiner

*Primary Examiner*—John B. Sotomayor
(74) *Attorney, Agent, or Firm*—Marsh Fischmann & Breyfogle LLP (57) ABSTRACT

A method of deinterleaving parameter descriptor word (PDW) data includes parallel scoring of pulses in an a posteriori search for associating of pulses based on proximity within a multi-parameter problem space. The a posteriori search includes scoring an oldest pulse against all newer pulses, and then scoring a next oldest pulse against all newer pulses. The associating utilizes at least one of a plurality of parallel computation modes, parallel tasks to operate on separate data fields, and multi-threading or multitasking that can implement one of parallel and configuration-overlaid operation, synchronized by events.

29 Claims, 8 Drawing Sheets

METHOD AND SYSTEM FOR DEINTERLEAVING

FIELD OF THE INVENTION

This invention relates to method(s) and system(s) for deinterleaving data and, more particularly, to a deinterleaving system and method which performs a parallel candidate search where required processing power scales linearly with the data density by providing performance that is proportional to the number of pulses processed.

BACKGROUND OF THE INVENTION

In a modern warfare environment many moving vehicles (airplanes, ships, tanks, etc.) are now equipped to include electronic warfare (EW) systems which assist in detecting, identifying and targeting opposing forces. One function of an EW system may be to detect and identify radar signals emitted from a number of different systems. This can be a very complicated task depending on the number of emitters within a particular environment.

In order to provide for this emitter identification one function performed by EW systems is the deinterleaving of the radar signals from the various emitters. Deinterleaving typically includes sorting of received pulses according to an analysis of various parametric information. Modern radar applications that perform deinterleaving may include those used in systems such as Electronic Warfare Support Measures (ESM) and ELectronic INTelligence (ELINT) radar systems. Deinterleaving radar pulses includes detecting and recognizing different simultaneously active radar emitters.

In a basic ELINT collection system, front end electronics are the first elements to receive RF energy from the signal environment. The front end electronics are composed of antenna(s) and signal detection components and may contain filters and amplifiers that improve the detection capabilities of the sensors. Digitized signals from the front end electronics are fed to a parameter measurement unit (PMU), which generates a parametric description of the signal. A parametric description includes characteristics like the pulse's time of arrival (TOA), amplitude, pulse width, frequency and electrical phase angle, for example. The digitized pulse trains are then fed to a deinterleaver. A conventional deinterleaver is apparatus that receives a plurality of interleaved pulse trains and deinterleaves a composite data stream into constituent pulse trains by detecting patterns in samples of pulses.

Deinterleavers typically identify the individual emitters that transmit each separate pulse train, where parameters, such as a "pulse repetition interval" (PRI) in a transmitted data stream, are analyzed. PRI determination, for example, allows pulses of a given radar to be separated from a background of pulses for radar identification. A PRI is typically determined by processing the time history of data corresponding to a discrete emitter. Each radar may be characterized by one or more patterns of PRIs that repeat from a given start time.

A large volume of data is required to be processed by a system such as an ELINT radar system. It follows that weight, size, cost, complexity, processing power, power consumption, and method of execution of the processing of the data are critical to improving system performance. This is especially important for allowing a single air vehicle, such as an unmanned air vehicle or "UAV", or missiles for example, to incorporate additional and improved capabilities.

In general, a sequence search algorithm identifies sequences of pulses where PRIs and phases of pulses in a single or multi-collector bitstream are extracted. For a PRI of m sequence intervals, there are m possible phases and N (sampling intervals) divided by m TOA's to be correlated. When the PRI of data streams is assumed to be from 1 to N, then a search of all possible sequences requires the order of $N \times N/m \times m = N^2$ computations. When additional processing is used to increase accuracy and resolution, the order can increase to $N^3$ or more.

Traditional deinterleavers may also perform repeated nested searches through PDW data, so that an amount of processing work involved in deinterleaving becomes proportional to the square or the cube of the number of PDWs to be processed. Thus, there is a need for reducing the processing work required for throughput of PDW data. The conventional deinterleaving systems may partition the data, for example, in groups that are defined in terms of one or more parameters. When parametric binning is performed it introduces the probability of signal fragmentation for parametrically agile signals.

In general, the computation load for applications such as ELINT are growing faster than Moore's Law can compensate, because data stream densities are increasing rapidly. Techniques such as Low Probability of Intercept (LPI) require higher sensitivity, thus intercepting larger volumes of data. In addition, data becomes lost when there is insufficient bandwidth to move all data from air, space, and ground collectors to ground processing. On-board fault management for conventional general purpose computers (GPs) is problematic for certain types of systems. There is also a demand for networked threat capability and short on time operating regimes, which are each rendered extremely expensive by using conventional systems that increase in complexity with a throughput density amount. Existing approaches require large SWaP support environments and are unable to be used in, for example, UAVs.

Conventional systems typically use a priori knowledge, which is further complicated by the need for comparing data in an environment that can include signals utilizing multi-level stagger and jitter. Since comparing in an a priori system is often backwards in time, a truly parallel algorithm cannot be implemented. What is needed is a method of evaluating potential relationships (i.e., scoring) that can be truly performed in parallel.

Embedded platforms require the technical ability to meet increasing size, weight, and power (SWaP) requirements of an operational unit, such as in an airborne system. These platforms also need a level of autonomy to handle faults and differing remote operations, such as with networking. Traditional systems use embedded computers, high-speed networks, and high performance middleware to provide integrated platforms, but these conventional methods of airborne computing have detrimental effects on associated ground support systems, such as a requirement that characteristics of individual applications be tailored or that significant system margins be included, in order to provide a necessary throughput and resulting quality.

SUMMARY OF THE INVENTION

The present invention allows solutions to the above-noted problems, and others, to be effected by utilizing scalable and configurable computational resources along multiple points in a system. Whereas traditional scoring of pulses was required to be implemented in a basically serial fashion due to conventional reliance on a priori scoring, the present method allows parallel scoring to be implemented. The truly parallel scoring may be implemented by utilizing reconfigurable hardware.

It is an object of the present invention to provide a method and system for improving traditional data processing techniques, so that search stages may truly be executed in parallel.

It is another object of the present invention to provide real-time linear throughput of PDWs in a parallel deinterleaver, where required processing power scales linearly with the data density by providing performance (algorithm order) that is proportional to the number of pulses processed.

It is a further object of the present invention to implement powerful deinterleaving of PDW data by synthesizing processing directly into hardware gates, while executing candidate search stages in parallel.

Described herein is a system and method for deinterleaving data streams which include a number of pulse words each representative of received pulses from a number of emitters. According to one method described herein, a data stream which includes a plurality of pulse words is received. Included in each pulse word is parametric information describing the pulse which may include, but is not limited to, time of arrival (TOA), angle of arrival (AOA), pulse width (PW), radio frequency (RF), pulse amplitude (PA), and unintentional modulation on pulse (UMOP). The parametric information may further include time difference of arrival (TDOA). As the pulse words are received in a serial fashion, a search thread is initiated upon the receipt of each pulse word. The search thread extends for a predetermined period of time and includes all pulse words received during that period. As part of the search thread, each received pulse word is scored as it is received. Scores are compared against the score for the old pulse word in the thread to identify one or more candidate pulse words for connection with the oldest pulse. Once one or more candidate pulse words are identified, further processing is performed in order to attempt to connect the oldest pulse word with the one or more candidate pulse words.

According to one configuration of the invention described herein, the system may be configured such that a plurality of search threads are generated and processed in parallel. Further, the system may be configured such that a new search thread is initiated every time a pulse word is received and the scoring is performed through use of parallel processing. Within each parallel search thread, a search is performed in order to identify one or more candidates for connection with the oldest pulse word in the thread. As part of the invention described herein, one function of the system is the generation of parallel pulse trains, where each train includes connected pulse words from a common emitter.

As part of the connection process, in order to start a new pulse train, a number of pulse words (such as four) are first identified as originating from a common emitter. As part of the process, a connection is attempted between a first pulse word and its top candidate pulse as identified in the search. The candidate pulse will also have one or more candidate pulses from the scoring and then each pulse thereon would have its own candidate pulses. When the certain number of pulse words are found to be connectable, a new pulse train is started. From then on, pulse words are added to the pulse train from a common emitter through evaluating candidate pulses for the last pulse word added to a particular train.

As was mentioned above, the parallel search threads only provide scoring for pulse words received within a particular time period. Using this a posteriori, analysis restriction is placed on the search to identify emitters only operating with a particular pulse repetition intervals (PRI). In order to identify pulse words for emitters with larger PRI's, a multi stage analysis may be performed. This multi stage analysis includes identifying pulse words not found connectable in a first stage as residue which then may be analyzed in additional stages. These additional stages would include time periods for search threads which are increasingly larger than the time period employed in the first stage. As with the first stage, the additional stages would perform searches in order to score the pulse words received within a particular time period. The connection process would be substantially the same as that described above.

In one configuration of the invention, the processes for all of the parallel search threads are performed on a reconfigurable computing (RCC) device. Further, the RCC device may comprise one or more field programmable gate arrays (FPGAs) configured in a manner to perform parallel processing.

A system configured to perform parallel candidate search deinterleaving may comprise a input device which receives incoming data streams from a plurality of emitter devices, where said input device is further configured to convert the incoming data stream to a word format for each received pulse. The input device is further connectable to a processor which is configured to receive each pulse word and to simultaneously score within at least one window, which may be part of a plurality of parallel windows, a number of pulse words received. The scoring may include employing parametric and interval match criteria in a backwards search from each oldest pulse word within the search window wherein the scoring is performed against all other pulses received during the particular window. As part of the scoring process, the processor is further configured to identify at least one candidate pulse within the window which may be connectable with the oldest received pulse word in a pulse train. The processor may be still further configured to establish a connection between the oldest pulse train in the window and one or more of the candidate pulse words which meet a plurality of connection criteria including batching PRI's.

In another configuration of the invention, the processor is configured as a RCC engine. The RCC engine may include at least one FPGA programmable device to perform deinterleaving operations both in sequence and in parallel. Information fed to the RCC engine may be via a single cycle first in first out (FIFO) memory configured to accept data from a parametric measurement unit. This parametric measurement unit may be configured to convert incoming pulse data from one or more emitters into pulse data words which are then processable by the system described herein.

In yet another configuration of the invention, the system described herein may be employable as part of an electronic warfare (EW) system. More specifically, it may be part of an electronic warfare support measures (ESM) and electronic intelligence (ELINT) radar system.

DETAILED DESCRIPTION

Figure 1:
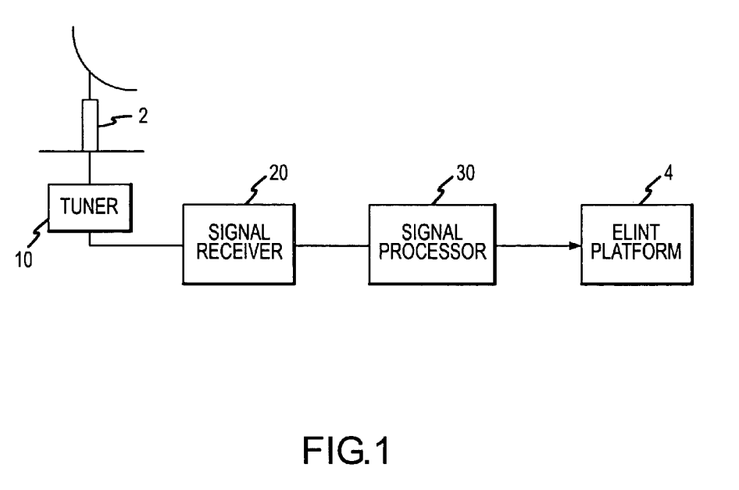
FIG. 1 discloses system diagram which performs deinterleaving functions.

Disclosed in FIG. 1 is a portion of a radar signal receiving and processing system which is employable for a number of uses including electronic warfare (EW). Portions of this system are specifically configured to provide for the deinterleaving of signals emitted from other radar systems. Included as part of the system is collector 2 which receives the radar signals from the various known and unknown sources in the environment. This collector may be stationary or mounted on a moving vehicle such as an aircraft. A tuner 10 is in communication with collector 2. The tuner 10 may contain at least one frequency select module that may be controlled for obtaining multiple frequency signals via the collector 2.

The output of the tuner 10 is fed to a receiver 20 which may include a digital interface and buffer, a receiver/channelizer, and a matched detector/channelizer with adaptive threshold. The receiver 20 is preferably able to detect a large variety of signal types over a wide range of frequencies and pulse widths. The receiver may be further configured with high sensitivity, a low threshold of detection, and multilevel detection and for different compression versions of data streams. The configuration of the receiver will be discussed in greater detail below.

A data stream which may contain interleaved data which is output by the receiver 20 to a processor 30. As will be discussed in greater detail below, one configuration of the processor 30 may include one or more reconfigurable computing (RCC) engines for performing deinterleaving of the data stream, and platform interfaces for devices such as a recorder, an inertial navigation system (INS), a data link, a network interface, and a system power supply.

Figure 2:
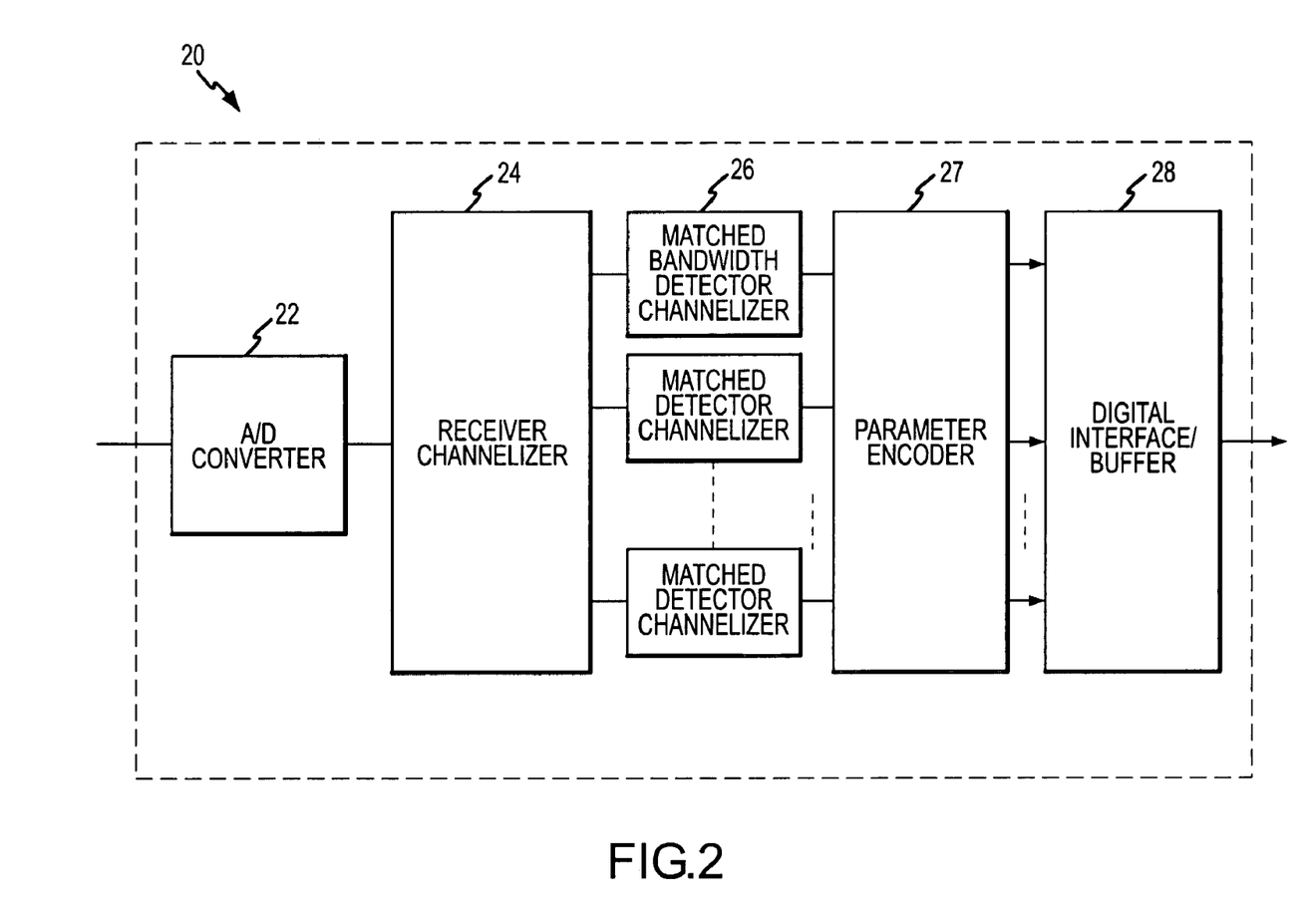
FIG. 2 discloses a system diagram for the signal receiver portion.

FIG. 2 illustrates an exemplary configuration of the receiver 20. Data to be processed is received from the tuner 10. The received signal from the tuner is then digitized by an analog-to-digital (A/D) converter 22 to produce a digital waveform. A channelizer 24 then channelizes the digital waveform, by frequency, into one or more channels of information. Each of these channels is then processed by a matched detector channelizer 26.

The signal output from digital channelizer(s) 26 are received by a parameter encoder 27 that encodes the received pulses into pulse descriptor words (PDWs) according to selected parameter information such as angle of arrival (AOA), time of arrival (TOA), as well as amplitude and pulse width. The parameter encoder 27 may further receive feedback control from processor 30. Feedback may provide increased sensitivity for analyzing data for a particular area of interest (AOI), or when emitters may not provide useful signatures by themselves. The PDWs can be processed to cluster, classify, identify, locate, and correlate the pulse train. Operation of the system can be tuned to meet varying needs for different AOIs, and can be coordinated for using partially processed data, such as by networking and using additional information.

The output(s) of the parameter encoder 27 are then received by digital interface and buffer 28 for further routing to processor 30. A data stream that may contain interleaved PDW's is output by the receiver 20 to processor 30. Further processes which may be performed during data collection by the receiver portion 20 may include filtering to determine RF and IF signals. Data collection may include detected video, parametric measurements, and descriptor word data.

The data generated by the receiver 20 may be of a number of different types. A multi-beam composite PDW may be formed by a number of pulses that are aligned in phase. A sequenced RF composite PDW may be formed by a number of RF pulses that have a sequential phase. A multipath composite PDW may be formed, for example, by a multipath type pulse and a corresponding side lobe pulse. A TDOA composite pulse may be formed, for example, when a receiving device has a particular range with respect to a ground reference point (GRP), and the GRP has a delta distance from an object of interest. In such a case, a TDOA composite PDW may be formed by pulses having a phase difference. In essence, a Descriptor Word contains the information pertaining to the characterization of RF energy at a particular time. This information is essential in the transformation of raw data into intelligence information. PDW's characterize pulse collections. They contain carrier frequency descriptor, polarization descriptor, location descriptor, spatial descriptor, pulse TOA descriptor, Modulation-on-pulse descriptor, pulse duration descriptor, and pulse amplitude descriptor. Each descriptor may also contain various parameter measurements.

Figure 3:
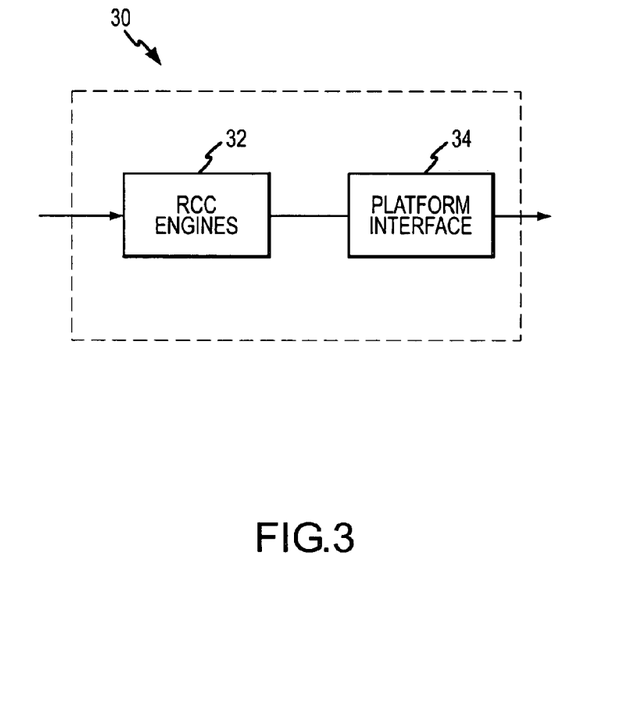
FIG. 3 discloses a system diagram for the processor portion.

In any case, the PDW data is presented to the processor 30 as a data stream that contains interleaved data. Disclosed in FIG. 3 is a system diagram for processor 30. The processor 30 includes reconfigurable computing (RCC) engines 32 for performing the PCS deinterleaving, and one or more platform interfaces 34 such as a recorder, an inertial navigation system (INS), a data link, a network interface, and a system power supply.

Although a number of processing configurations may be employed, because of the unique processing algorithms used by the PCS deinterleaver in which a number of multiple operations are to be performed in parallel, traditional general purpose (GP) microprocessors may not support the levels of parallelism that are used to implement the PCS algorithms. Alternatively, or in addition to, the use of the GP, field-programmable gate arrays (FPGAs) may be employed.

Figure 4:
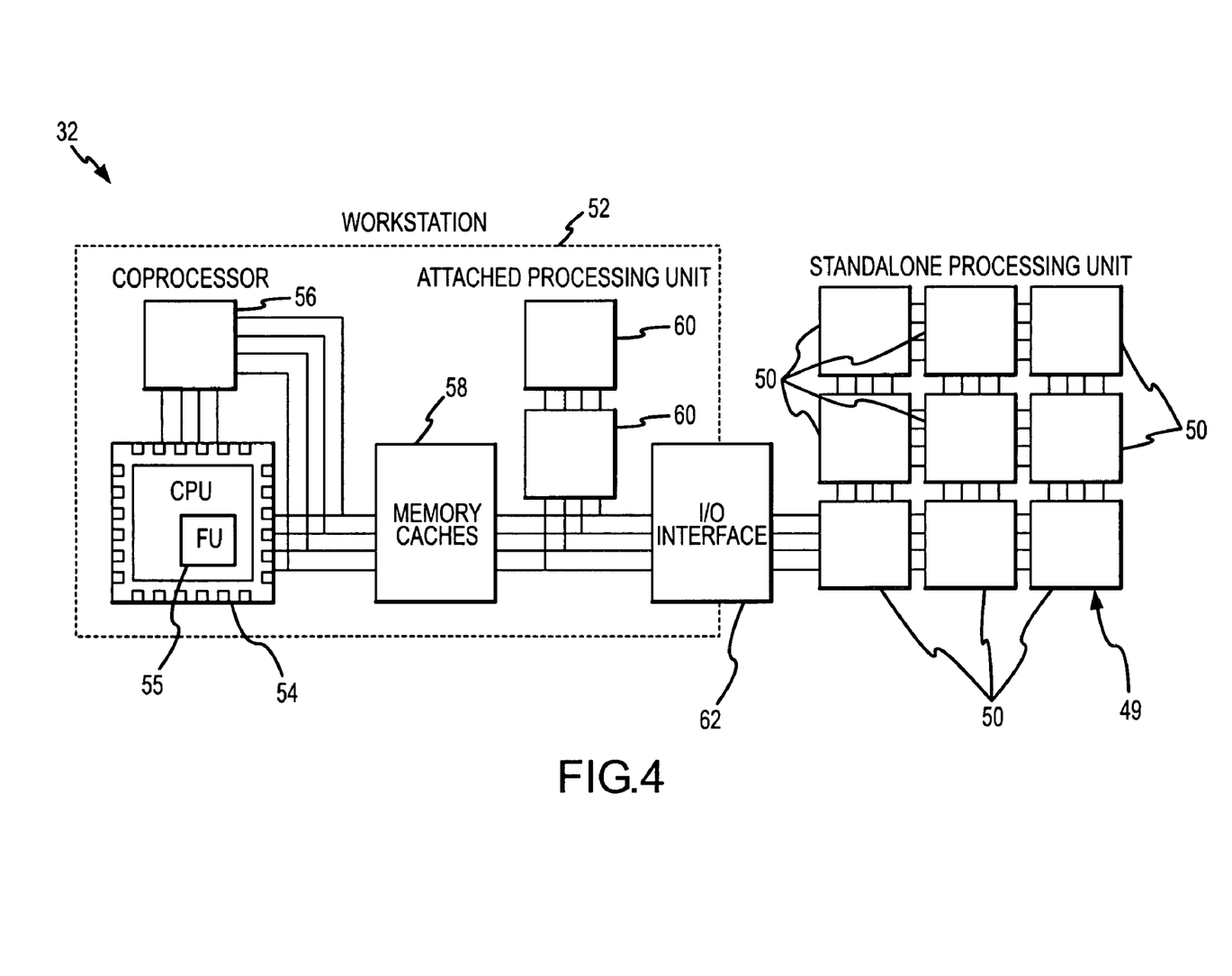
FIG. 4 discloses an embodiment of the reconfigurable computing engine (RCC).

Disclosed in FIG. 4 is one configuration of a RCC engine 32 which combines both the use of the GP and one or more FPGAs. Shown in particular in FIG. 4 are three different configurations for combining GPs and FPGAs wherein the configuration shown may be used either alone or in combination with the others. In a first configuration, a FGPA 56 can be used solely to provide a reconfigurable functional unit within the host processor. Here the FPGA's execute as functional units on the main microprocessor data path. In a second configuration, a FPGA may be used as a co-processor 56 with the GP 54. The co-processor is typically able to perform computations without the constant supervision of the host processor. The GP initializes the FPGA and either sends a necessary data to the logic or provides information on where this data might be found in memory. This type of coupling allows the FPGA to operate for a large number of cycles without intervention from the GP and generally permits the GP and FPGA to execute simultaneously.

In another modification of the system shown in FIG. 4, an attached reconfigurable processing unit made up of one or more FPGA's 60, and may behave as if it is an additional processor in a multi-processor system. Locatable between the attached processing unit and the GP is a memory cache 58. This memory cache 58 is not visible to the attached processing unit. Although there is a significant delay when communicating configuration information through the memory cache 58, this configuration does provide more computational independence by shifting large sums of computation to the attached FPGAs.

Finally, a configuration is also possible which employs an external stand alone processing unit 49 which is comprised of a number of FPGAs 50 in a desired array configuration. Through this type of configuration the reconfigurable hardware portion communicates and frequently with the host processor.

In whatever configuration used, the FPGA's may be programmed via a high-level language to perform specific deinterleaving operations both in sequence and in parallel. In the exemplary configuration, an RCC 32 (including one or more FPGA's), can be viewed as a combination of hardware, software, and configware. The RCC system includes development software that receives configuration information in the form of an application specification, which is used for partitioning or assignment of hardware tasks and functions by the development software. A partitioning section of the RCC software receives information regarding the design patterns and drivers available in the RCC hardware section, and partitions the development routines into development routines for FPGAs and development routines for GP's of the hardware section. The software performs individual testing of the development routines and then performs a system test/simulation of a combined configuration for the available patterns and drivers. The tested configuration for the particular application is then transformed into package-specific configuration information by a packaging section of the software. The package-specific configuration information is then stored in a configuration memory in the hardware section of the RCC. The hardware section includes FPGAs and GPs for implementing the package-specific configuration information.

A memory may store resident information used by the FPGAs and GPs, such as operating system and cache type data, instruction sets, addressing information, etc. The design patterns and available drivers may be continually changing according to a sequence of PCS algorithms and their corresponding requirements. The resident memory may store portions of configuration information that is commonly used and/or repeated, so that a memory requirement and access speed for the configuration memory is optimized. For example, the resident memory may be a mass storage device having its own cache system and DSPs that are independent of the configuration memory.

In one configuration of the invention described herein the deinterleaving processing architecture provides parallel computation and data handling for an ELINT system. The system may be configured to include multiple stages of data processing. As such, a cascaded network is configured so that as part of a multistage system, each downstream deinterleaver receives residue from an upstream deinterleaver. Structured signals are extracted first, and complex signals are extracted from reduced pulse data. A dwell may apply to an RF/phase binning operation, which provides pulses as a bitstream. The pulses are processed by a priority-based series/parallel configuration of deinterleavers. Pulse trains are formed by connections determined by the deinterleavers, and a residue left over from the processing can be output for further processing. An intra-dwell associator outputs trains by combining individual trains composed of connected pulses.

In an exemplary implementation of the PCS deinterleaver, more than 600 comparisons and 900 assignments can be executed on each clock cycle on a single chip. Larger FPGA chips, available from vendors such as Xilinx, can support additional comparisons and assignments in a single clock cycle, providing a system capable of several MPPS. It would take a large number of GP microprocessors to provide equivalent computing power. In addition, even if such a large number of GP microprocessors were available, there would be a large investment in code required to dedicated synchronization and communication. Issues of synchronization and communication are thus greatly simplified by the RCC method. The Xilinx FPGAs generally use a symmetrical array type architecture having a look-up table type of logic block and a static RAM type programming technology.

In order to meet the throughput demand of the present system, RCC provides computing via a spatially programmed connection of processing elements. Unlike traditional deinterleaving apparatus that use a dedicated general purpose processor, the RCC computational architecture is reconfigured to meet the specific needs of an application. Computational tasks are accomplished in a spatial engine by composing interconnects between primitive operations and operators. This is different from traditional deinterleaving processing, where computations are performed in a strictly temporal fashion. By comparison, spatial solutions provide the benefit of fine-grained, highly parallel processing without the tremendous overhead of data cube management.

RCC has the ability to describe the computational configuration in a high-order language. The high order language used in preferred embodiments of the present invention is the Handel-C language from Celoxica. Handel-C allows description of the computational algorithm without regard to how the algorithm is implemented. Handel-C is employed as a programming language rather than a hardware description language (HDL). In some senses, Handel-C is to programmable logic devices what a conventional high-level language is to general-purpose processors. The output of Handel-C is in EDIF format for various FPGA devices.

During operations of the above-described system, the collectors initially receive radar signals from one or more emitter sources. The radar signals are processed, as described above, by the tuner and the signal receiver portions of the system. In the receiver 20, the pulse data is converted by the encoder to a stream of PDW's. The PDW's are stored in a digital buffer and transmitted to the signal processor 30 on a FIFO basis, each on its own clock cycle. At this point, the signal processor performs the deinterleaving process.

Generally, deinterleaving process includes the steps of scoring each PDW received and using that calculated score in order to establish connections with one or more PDW's with equivalent scores. These identified PDW's then may be connected in one or more pulse stream which then may be provided to other platforms within the system for further analysis.

The PCS deinterleaving method according to the present invention uniquely uses an a posteriori method for scoring PDW's. More particularly, PDW data is processed by parallel scoring of pulses in an a posteriori search for associating of pulses based on proximity within a multi-parameter problem space. The a posteriori search includes a first stage with predetermined time based windows being used for searching forward from each received pulse. Subsequent stages preferably utilize progressively larger windows, although the number of stages, the span of search windows, and the corresponding evaluation algorithms are all reconfigurable. During the search portion of a stage, parallel scoring is used for evaluating parameters for each PDW, for active ones of the first windows. An associating of PDWs having met scoring criteria is then performed when a given window closes, the associating being performed for each oldest pulse, then for each next oldest pulse, etc.

Selected candidates are then used for forming trains of the selected candidate PDWs. After forming trains in a first stage, the residue from the first stage is fed to a next stage of the search, the next stage comprising forming second windows extending backwards in time from each pulse of the residue for a second predetermined time, the second predetermined time being greater than the first predetermined time. The parallel scoring then evaluates parameters for each PDW, for active ones of the second windows. An associating for closed windows may proceed while searching is being performed for another thread in the parallel processing. The evaluating preferably is based on measurements of a pulse repetition interval (PRI).

Figure 5:
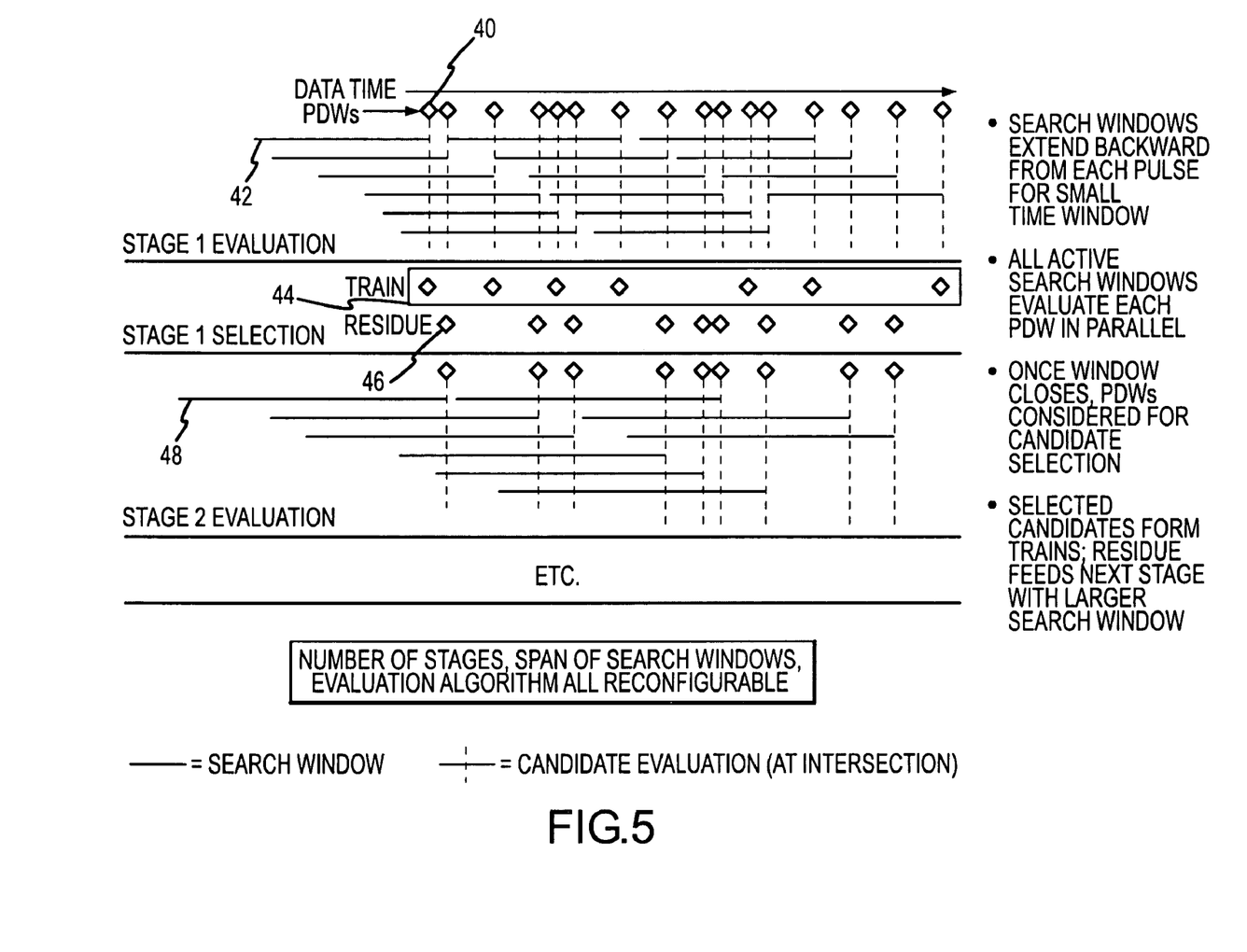
FIG. 5 discloses a diagram which illustrates the parallel scoring of PDW's during the interleaving process.

Disclosed in FIG. 5 is a diagram which provides a graphical representation of the operation of the parallel scoring and connecting of PDW's in pulse trains. As is seen, the PDW's 40 are received in a serial fashion, each being received on a particular clock cycle. Further shown in the diagram are the various parallel search threads 42. As can be seen, as each PDW 40 is received, a new search thread 42 is started. Each PDW is then included in the parallel scoring by a number of search threads. The intersection of a PDW with a search thread indicates the point in time at which a particular PDW is scored by each thread. As will be described in greater detail below at the completion of each of the search threads, a number of candidates for attempting connection will be selected for the PDW which started the particular search thread.

Further shown in the graphical representation of FIG. 5, is that as part of the connection process, certain PDW's 44 will be linked in a train by the connection process while others which are not connected are identified as residue 46. The residue will be further processed in additional stages 48 which employ search threads which cover larger periods of time.

Each candidate search may be thought of as a forward search from each received pulse that extends for a specified time interval, scores parametric (and interval) match with all other pulses in a search window, and identifies top candidates. In short the candidate assessment is based on an integral score associated with each candidate.

Figure 6:
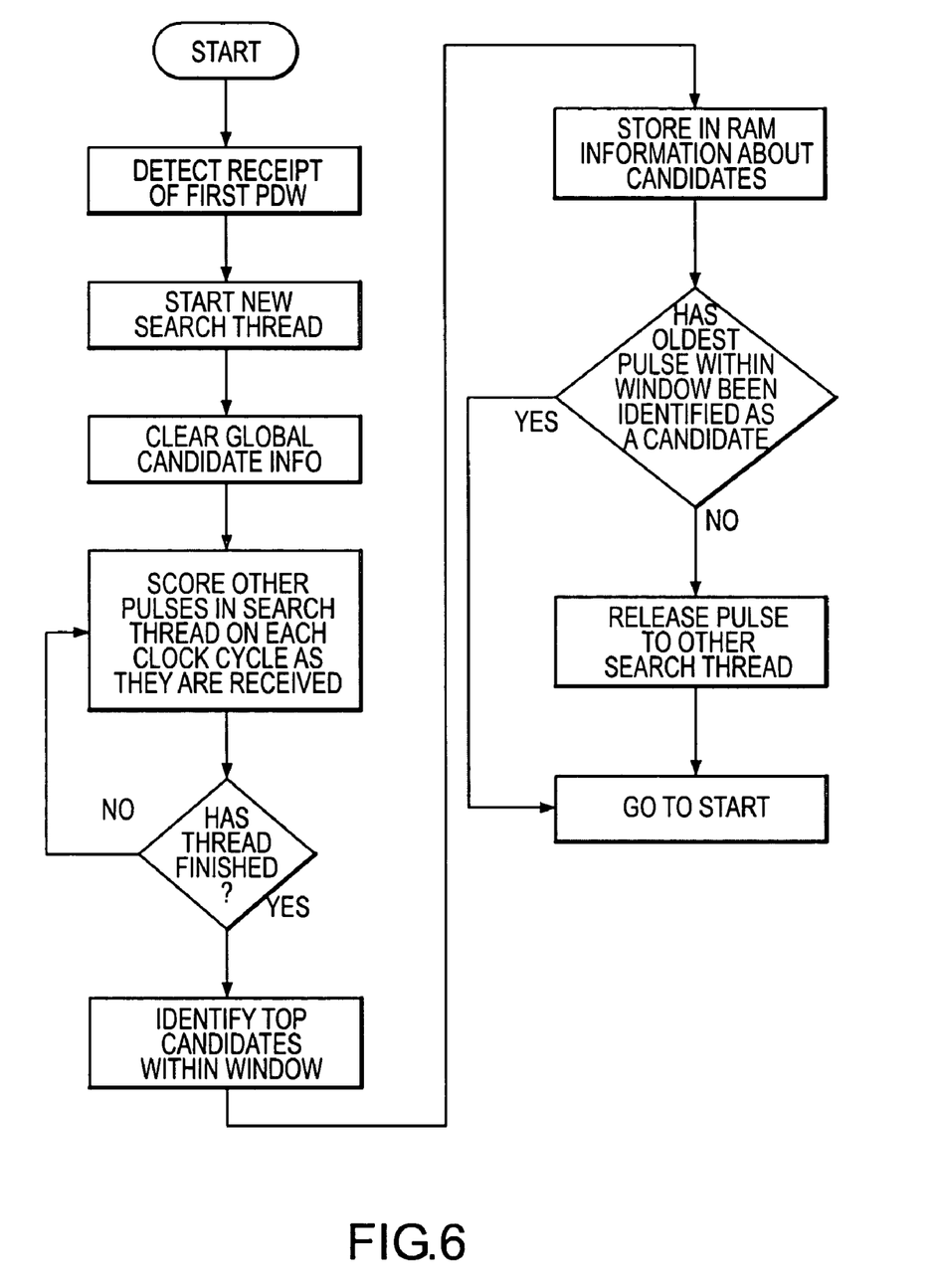
FIG. 6 discloses a flow chart which describes in detail the steps performed during the search portion of the pulse deinterleaving process.

As was mentioned above, the deinterleaving process may be broken down into two parts. The two parts include a search portion and connect portion. Disclosed in FIG. 6 is a flow chart which describes the search portion. Described in particular are the search steps performed by each of the search threads.

As described above, the PDW's are received by the RCC in a serial fashion, where each PDW arrives on a clock cycle. According to FIG. 6, upon the receipt of a PDW, a new search thread is spawned. As an initial condition, the first pulse recognizes that the prior search using the particular search thread is complete and clears the global candidate information, indicating that no candidates currently exist. At this point, the oldest pulse is the first pulse. As additional PDW's are received on future clock cycles, a score is generated for each received PDW. In fact, each of the currently open search thread performs its own scoring of the received PDW.

In the normal mode of operation, scoring a pulse can be performed on a single clock cycle. Typically, one thread is always waiting to receive the next pulse. Generally on each clock cycle, one thread completes its candidate search. Once the candidate search is complete for a particular thread, the candidates for a particular PDW are identified and this information is written to RAM and associated with the particular PDW. The only limitation on search and distance employed for the threads is the limitation on how many threads can be processed on a FPGA.

Figure 7:
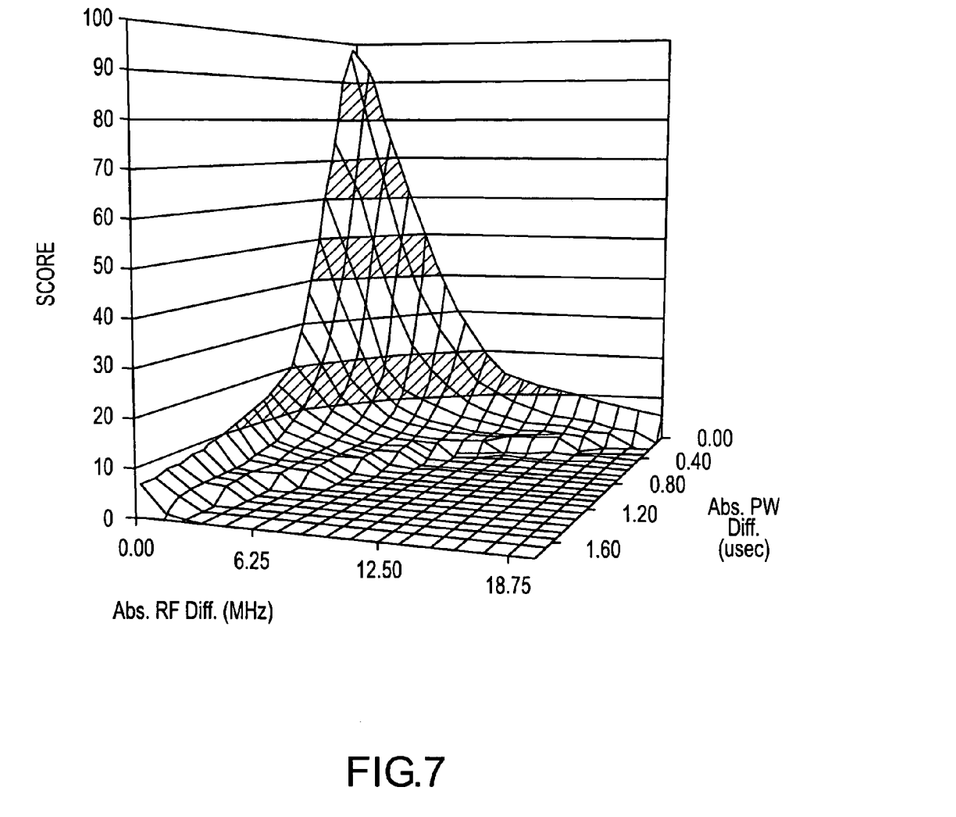
FIG. 7 discloses a table employable in scoring PDW's.

An initial scoring may consider such things as radio frequency (RF), pulse width (PW), and pulse amplitude (PA). Close RF and PW between pulses may be assigned a score from using a conceptual table such as the one disclosed in FIG. 7. As can be seen, the closer the absolute difference between the two values during evaluation of pulses, the higher the score. It should be noted that minimal score in only one parameter results in a minimal score. A score may be reduced for a large difference in PA. Still further, the initial score con be increased/reduced for conditions which deem a relationship more/less likely.

During the normal operating conditions, if the oldest pulse not evaluated as a candidate is older than the current search interval, the oldest pulse is released to all the search threads for simultaneous scoring. The next oldest pulse recognizes that the search is complete and updates the global candidate information. However, if the oldest pulse is within the search interval, the number of active search is merely increases by one. With the scoring of the various pulses complete the connection process can begin.

Figure 8:
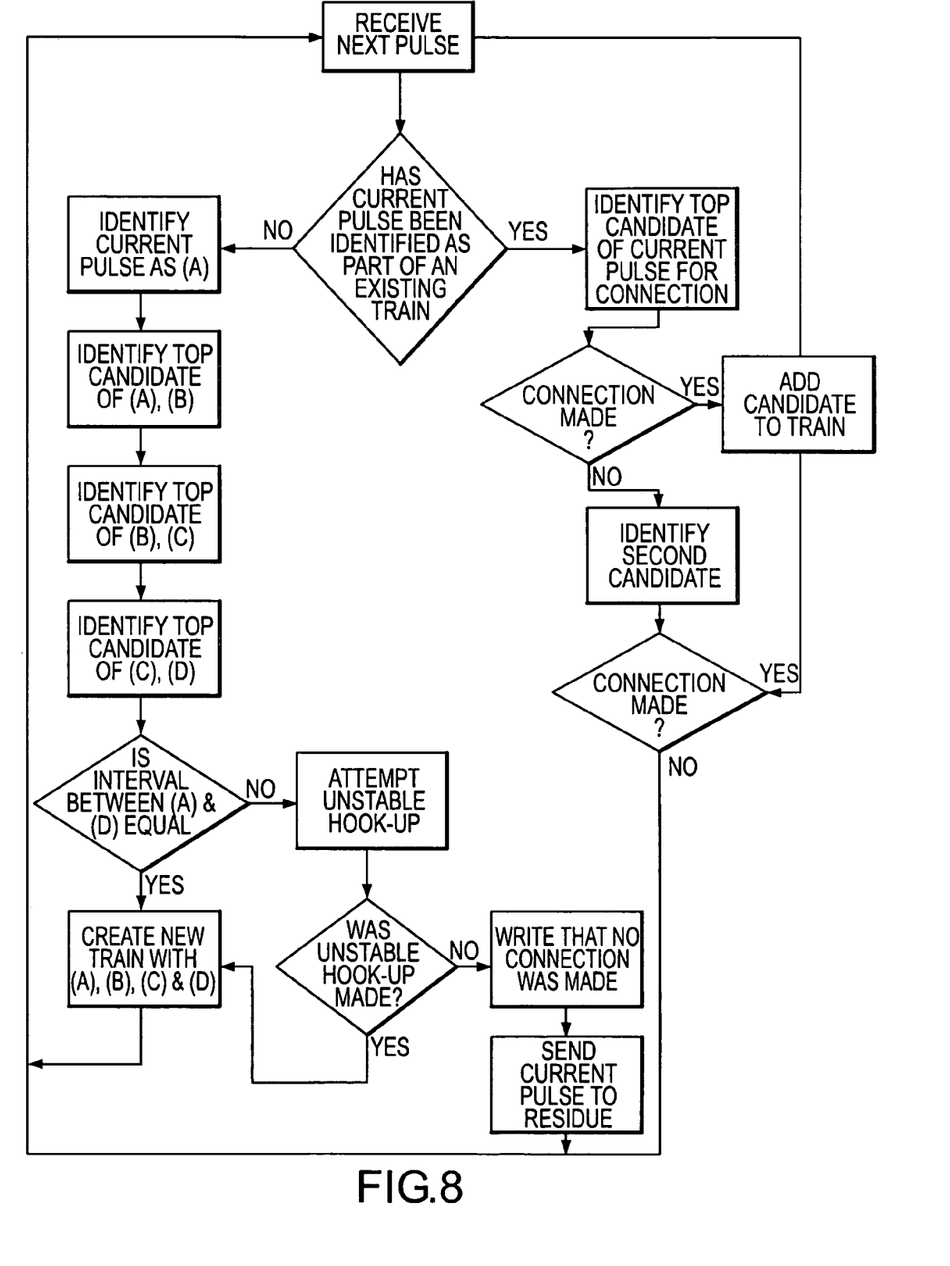
FIG. 8 discloses a flow chart which describes in detail the steps performed during the connect portion of the pulse deinterleaving process.

Disclosed in FIG. 8 is a flow chart which describes in detail the process performed by the system during the connection process. The connection process provides for the association of the PDW's from the same emitter in a pulse train which then may be transmitted to other components within the system for further analysis. As was mentioned above, during the scoring process for a particular PDW, a number of top candidates for connection are identified for each PDW. In the exemplary system described herein, the first and second candidate are identified for each PDW. Described in the flowchart of FIG. 8 are two portions of the connection process. The portion including the processes for starting a new pulse train and the second portion including the addition of PDW's to existing pulse trains.

Generally, the connect process loops through all the pulses and attempts to connect with the highest scoring candidate. When no connection is made, it then attempts to connect to a second highest scoring candidate. If no connection is made at this point, the system will then attempt to connect using repeated intervals. If this provides no connections, a check will then be performed for one or more missed pulses along an unstable interval sequence, for other available candidates.

In order to start a new pulse train, a first pulse (a) is first identified. Subsequently, the top candidate of the first pulse (a) is identified (b). Still further, the top candidate of (b) is identified (c), and the top candidate of (c) is identified (d). One criteria checked is whether or not the interval between (a) and (b) is a direct match with interval between (b) and (c). In the situation where other combinations involving a second highest scoring candidates are identified additional clock cycles may be employed. Once all the pulses and top candidates are identified, the first step is determined whether a stable interval exists between the various pulses. If the stable interval is identified, a pulse train may be formed.

Into the situation where the current pulse has been identified as being part of a pulse train, additional analysis may be performed in order to add additional pulses to the current train. As an initial step, the top candidate of the current pulse is identified. A connection is then attempted with the top candidates using the interval test. In performing this process, a minimal path is taken through the code that produces a connection. Once the connection tests are attempted, and a connection is not made, the same analysis may then performed with the second candidate.

As was discussed above, any of the pulses which are not to made part of a pulse train, are identified as residue. The residue pulses of are then analyzed in additional stages of the search and connect process. As was mentioned above, the additional stages each have increasing search thread lengths relative to the first stage discussed above, and as such are employed for identifying PRI's for emitters which are larger and than the search threads of the first stage.

The embodiments described above are for exemplary purposes only and is not intended to limit the scope of the present invention. Various adaptations, modifications and extensions of the embodiment will be apparent to those skilled in the art and are intended to be within the scope of the invention as defined by the claims which follow.

What is claimed is:

1. A method of deinterleaving a data stream which includes a plurality of pulse words each representative of received pulses from a plurality of emitters comprising pulse data words (PDW's) generated from received signals from a plurality of emitters comprising the steps of:
    receiving a data stream which includes a plurality of the PDW's;
    receiving a first PDW, and establishing a first set of candidate information based on parameter information included in the first PDW;
    starting a search thread and scoring each additional PDW received within a first time period in an a posteriori search and identifying one or more candidate PDW's based on a comparison with the first set of candidate information; and
    connecting in one or more pulse trains, the first PDW and identified candidates which meet a predetermined criteria.

2. A method of claim 1 wherein additional search threads are created upon receipt of each of the PDW's and evaluation of the PDW's is performed in parallel for each of the search threads.

3. A method according to claim 1, wherein the scoring is based on deinterleaving parameters comprising at least one of time of arrival (TOA), angle of arrival (AOA), pulse width (PW), radio frequency (RF), pulse amplitude (PA), and unintentional modulation on pulse (UMOP).

4. A method according to claim 2, wherein the scoring is based on time difference of arrival (TDOA).

5. A method of claim 1 wherein the additional PDW's not identified as candidates in any of the parallel search threads, are identified as residue and are further processed in one or more additional stages which employ time periods longer than the first time period.

6. A method according to claim 1, wherein the a posteriori search is composed of a plurality of stages, each stage being for extracting signals within a respective time interval range.

7. A method according to claim 6, wherein the time interval is sized to encompass a pulse repetition interval (PRI) for one or more known emitters.

8. A method according to claim 6, wherein the plurality stages employ time intervals which grow larger in succession.

9. A method according to claim 8, wherein each of the additional stages includes a candidate search portion and a pulse connection portion.

10. A method according to claim 9, wherein the candidate search portion comprises: searching forward from a received pulse up to a specified time;
    a posteriori scoring of parametric and interval matches for the received pulse and all other pulses within the specified time; and
    identifying a predetermined number of top candidates based on the scoring.

11. A method according to claim 1, wherein the scoring is performed on a single clock cycle of a reconfigurable computing (RCC) device.

12. A method according to claim 11 wherein the RCC comprises one or more field-programmable gate arrays (FPGA's).

13. A method according to claim 9, wherein the pulse connection portion comprises each received pulse attempting to connect with at least one of: a highest scoring received pulse in the specified time and a second highest scoring received pulse.

14. A method according to claim 13, further comprising, if no connection is made, checking for missed pulses along an unstable interval sequence.

15. A method according to claim 1 further comprising the step of accepting the data stream from a parameter measurement unit via a single-cycle first-in-first-out (FIFO) memory; and
    composing parallel interconnects in a spatial processing engine that reconfigures processing hardware according to a high-level source program.

16. A method according to claim 15, wherein the step of connecting the PDW's is based on requirements of an a posteriori candidate search that windows the data from the parameter measurement unit based on temporal parametric information.

17. A method according to claim 16, wherein the candidate search includes searching each window for pulse repetition intervals based on a scoring mechanism.

18. A method according to claim 1, wherein the connecting of PDWs forms trains, the method further comprising connecting a plurality of the trains, from parallel locations, into longer trains that form candidate signals.

19. A method according to claim 1, wherein the scoring comprises determining a parametric score for an incoming pulse against every other pulse within the predetermined time period in order to determine a top candidate for the incoming pulse.

20. A system configured to perform parallel candidate search deinterleaving, comprising:
    an input device for receiving an incoming data stream of pulse from a plurality of emitter devices, said input device being further configured to convert the incoming data stream to a word format for each received pulse; and
    a processor configured to receive the pulse stream in word the format and to:
        simultaneously scoring within a plurality of first a posteriori windows, of a plurality of windows, wherein the scoring includes employing parametric and interval match in a backward search from each oldest received pulse word within the a priori window, the scoring being performed against all other pulses in the window;

identifying at least one candidate pulse within each of the a posteriori windows for connecting with the oldest receive pulse word; and connecting in a pulse train the oldest pulse word from each of the windows and each of the candidate pulse words which meet a plurality of connection criteria including matching pulse repetition intervals (PRIs).

21. The system of claim 20 wherein the scoring is based on deinterleaving parameters comprising at least one of time of arrival (TOA), angle of arrival (AOA), pulse width (PW), radio frequency (RF), pulse amplitude (PA), and unintentional modulation on pulse (UMOP).

22. The system of claim 21 wherein the scoring is based on time difference of arrival (TDOA).

23. The system of claim 20 wherein the processor is further configured to further process pulse words not connectable in a pulse train as residue in one or more additional stages which employ a priori windows of durations greater than the first a posteriori window.

24. The system of claim 20 wherein required processing power of the processor is configured to scale linearly with data density of the data stream by providing performance that is proportional to the number of pulses processed.

25. The system of claim 24 wherein the processor is configured as at least one reconfigurable computing (RCC) engine.

26. The system of claim 25 wherein the RCC engine includes at least one field-programmable gate arrays (FPGAs) programmable via a high-level language to perform deinterleaving operations both in sequence and in parallel.

27. The system of claim 20 wherein the deinterleaving is performed as part of at least one of: an Electronic Warfare Support Measures (ESM) and ELectronic INTelligence (ELINT) radar system.

28. The system of claim 20 further including a single-cycle first-in-first-out (FIFO) memory configured to accept the data from a parameter measurement unit.

29. The system of claim 20 wherein the input device includes a parameter encoder configured to convert radar pulses to pulse descriptor words (PDW's) which are deinterleaved by the processor.

* * * * *